United States Patent [19]
Ott

[11] 4,004,102
[45] Jan. 18, 1977

[54] AUTOMATIC IMPEDANCE MODIFICATION OF TRANSMISSION LINES

[75] Inventor: Henry Walter Ott, Livingston, N.J.

[73] Assignee: Bell Telephone Laboratories, Incorporated, Murray Hill, N.J.

[22] Filed: Aug. 8, 1975

[21] Appl. No.: 602,988

[52] U.S. Cl. ............................ 179/16 F; 179/170 R
[51] Int. Cl.² ............................................. H04B 3/40
[58] Field of Search ............ 333/32, 33; 179/16 F, 179/170 R, 170 T

[56] References Cited
UNITED STATES PATENTS

| | | | |
|---|---|---|---|
| 3,578,914 | 5/1971 | Simonelli | 179/16 F |
| 3,582,563 | 6/1971 | Gragg | 179/81 R |
| 3,671,676 | 6/1972 | Henry et al. | 179/16 F |
| 3,706,862 | 12/1972 | Chambers, Jr. | 179/16 F |
| 3,818,151 | 6/1974 | Chambers, Jr. et al. | 179/16 F |

*Primary Examiner*—Kathleen H. Claffy
*Assistant Examiner*—Randall P. Myers
*Attorney, Agent, or Firm*—John Francis Moran

[57] ABSTRACT

An automatic impedance matching network for a transmission line includes an impedance monitor which provides a control signal for two variable compensators. One compensator corrects an impedance mismatch at low frequencies while the second compensates within a higher frequency range. A directional sensor completes a conductive path for the control signal to the variable compensators only for the direction of signal propagation indicative of the impedance of the transmission line being compensated. The disclosed arrangement operates automatically from the intelligence signals transmitted over the line to provide impedance compensation for a variety of cable sizes of different lengths.

7 Claims, 4 Drawing Figures

| CABLE SIZE (GAUGE) | END SECTION (FEET) | RESISTANCE(OHMS) (FREQ) 400Hz | CAPACITANCE($\mu$F) (FREQ) 1.5KHz, 2.5KHz | |
|---|---|---|---|---|
| 26 | 2500 | 800 | .049 | .048 |
| 26 | 3000 | 800 | .031 | .029 |
| 26 | 3500 | 800 | .022 | .018 |
| | | | | |
| 24 | 2500 | 900 | .048 | .043 |
| 24 | 3000 | 900 | .041 | .035 |
| 24 | 3500 | 900 | .028 | .022 |
| | | | | |
| 22 | 2500 | 1800 | .054 | .043 |
| 22 | 3000 | 1800 | .044 | .035 |
| 22 | 3500 | 1800 | .039 | .025 |
| | | | | |
| 19 | 2500 | 1900 | .048 | .044 |
| 19 | 3000 | 1900 | .042 | .035 |
| 19 | 3500 | 1900 | .034 | .023 |

AUTOMATIC IMPEDANCE MODIFICATION OF TRANSMISSION LINES

BACKGROUND OF THE INVENTION

This invention relates generally to impedance matching arrangements and, more particularly, to an arrangement for modifying the impedance characteristics of a transmission line to provide a desired impedance.

In numerous circuit applications, it is essential to provide electrical networks that have a specified input impedance. Impedance matching in transmission systems is a primary concern since a correct match provides maximum power transfer for the transmitted intelligence signal between the various components along the transmission path. An impedance mismatch, for example, between a telephone line and a repeater, will result in a signal loss and produce a reflection of the signal. Reflections in the signal may then produce instability or singing of repeaters in the telephone circuit or may occasion echos which are subjectively objectionable to the telephone user.

Present day telephone transmission facilities present a wide range of impedances since the transmission loop may be of various or mixed gauge construction or may be loaded or non-loaded. Furthermore, the length of the telephone loops vary considerably which has an impact on impedance. A conventional technique for compensating telephone loops with unacceptable impedance levels that connect the central office to the telephone subscriber is by installing a line build-out network in each telephone loop. This type of compensation requires a large number of such networks which are costly and require elaborate and time-consuming installation adjustment by trained personnel. Moreover, since these line build-out networks are adjusted to a specific telephone loop, they are dedicated to that loop. Such networks therefore cannot be utilized within concentrated locations between the switching stages of a central office wherein a smaller number of switched concentrated links and associated build-out networks are able to serve a larger number of telephone subscriber loops.

Accordingly, it is a primary object of this invention to provide impedance matching for bidirectional telephone repeaters that serve telephone subscriber loops so that this apparatus may be utilized in the concentrated links between the switching stages of a telephone central office, thereby substantially reducing the number of telephone repeaters and associated impedance matching networks.

SUMMARY OF THE INVENTION

Broadly, the invention automatically modifies the impedance characteristics of a transmission line as the line is transmitting an intelligence signal by comparing voltages indicative of the signal current and signal voltage in an impedance monitor. In accordance with a fundamental aspect of the invention, the amplitude of at least one of the signals is changed to produce a pair of signals that have a substantially equal amplitude when the signal current and voltage are indicative of a prescribed impedance. The amplitude of the pair of signals are then compared to each other to produce a control signal indicative of the impedance of the transmission line. An impedance matching network responsive to the amplitude of the control signal produced by the impedance monitor adjusts the shunting resistance across the transmission line in accordance with the amplitude to provide low frequency compensation. The impedance matching network also changes the effective shunting capacitance across the transmission line as the amplitude of the control signal varies to provide high frequency compensation for the line. The compensation serves to alter the impedance of the line to correspond substantially to the desired impedance over the bandwidth of the transmitted signal in a range that falls within the combined range of the low and high frequency compensation. Circuitry is provided to ascertain the direction of propagation of intelligence signals transmitted by the line and to provide a conductive path for the control signal for application to the impedance matching network for a predetermined direction of propagation. Since test signals are not required to provide the impedance compensation, the arrangement automatically operates in response to actual transmission conditions and may be advantageously employed within the concentrated links between the switching stages of a central office.

In some of its more specific aspects, the impedance monitor utilizes filter circuits to provide a control signal which is indicative of an average impedance value. The invention employs variable impedance compensators as the impedance matching networks which utilize field effect transistors. The field effect transistors change the effective resistance across the transmission line and the effective shunting capacitance on the line in response to the control signal. A holding circuit at the input to each field effect transistor maintains the previous compensation setting when the control signal is not being applied to the impedance compensator. Furthermore, a high frequency compensator serves to correct phase angle deviations normally present when the variable impedance compensators are appropriately adjusted.

BRIEF DESCRIPTION OF THE DRAWING

Features of the invention and additional objects of the invention will be more readily appreciated and better understood by reference to the following detailed description which should be considered in conjunction with the drawing in which.

DETAILED DESCRIPTION

Figure 1A:
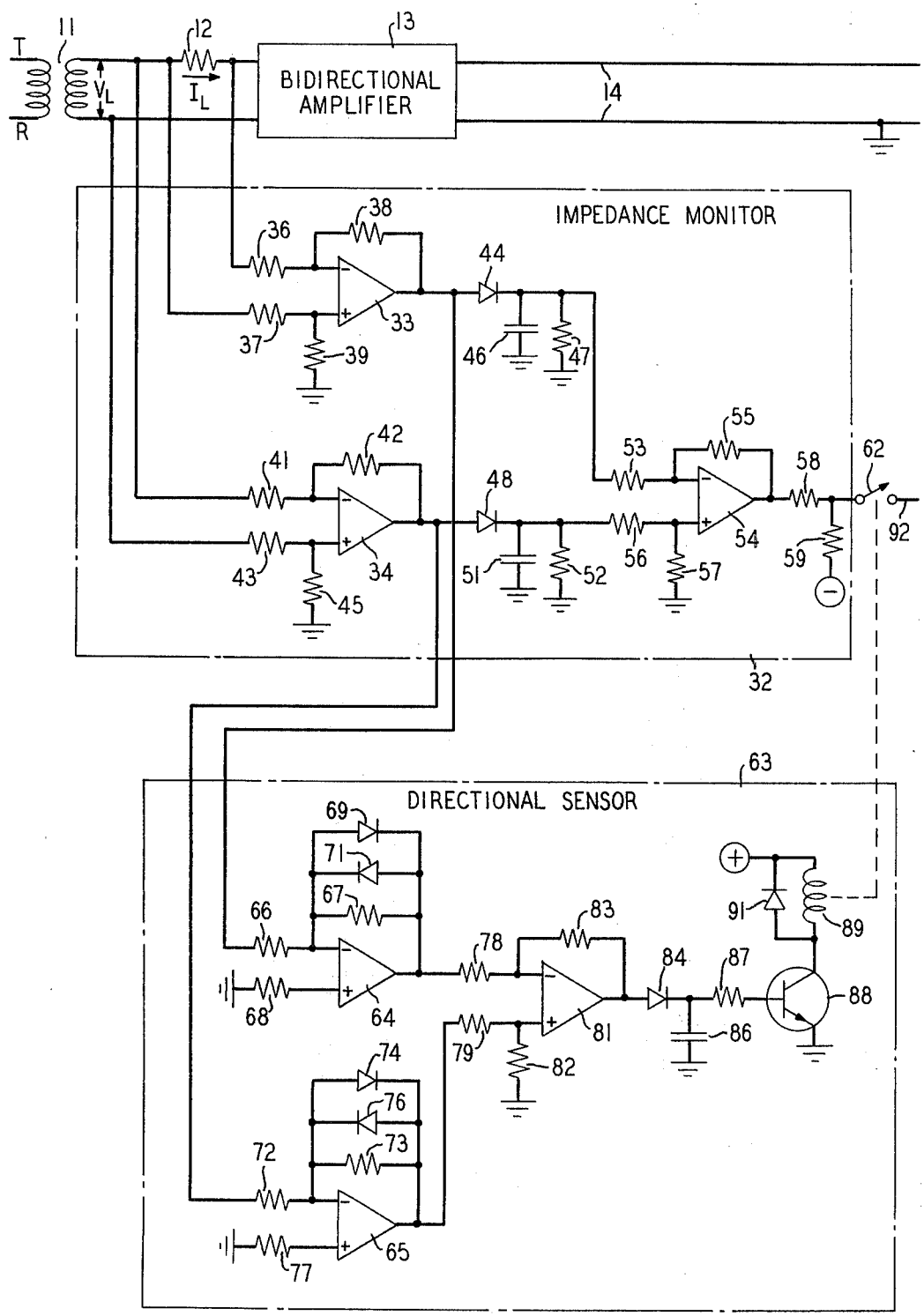
FIGS. 1A and 1B, when juxtapositioned as shown in FIG. 2, constitute a detailed diagram of an illustrative embodiment of the invention.
Figures 1B, 3:
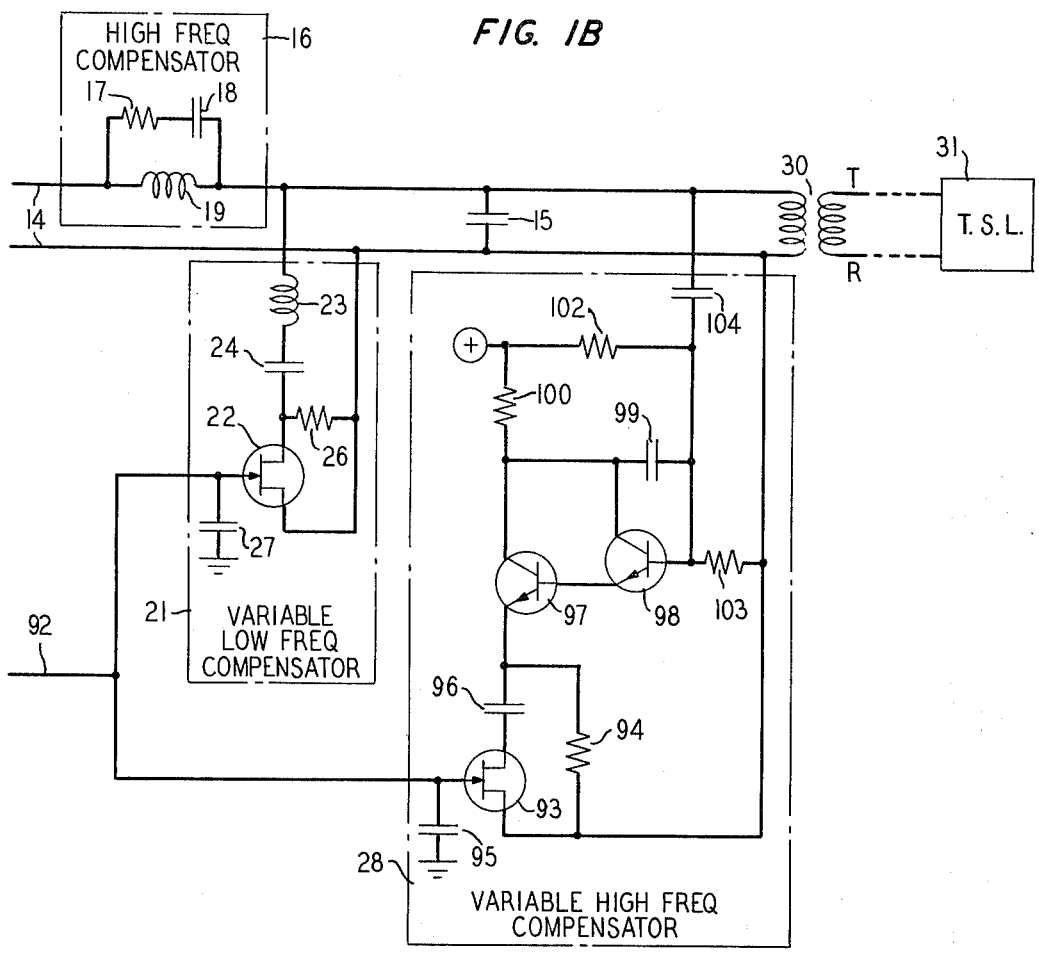
FIG. 3 is a table illustrating typical transmission lines for which the invention may be utilized to provide impedance compensation.

FIGS. 1A and 1B, which should be oriented in accordance with FIG. 2, are sections of a detailed diagram of a complete illustrative embodiment of the invention. In FIGS. 1A and 1B, transformer 11 couples an intelligence signal through serial resistor 12 to bidirectional amplifier 13 which may be any type of repeater including a negative impedance repeater or a hybrid amplifier. The other end of amplifier 13 is connected to a two-wire bidirectional transmission line 14 which, in turn, is coupled through compensator 16 to transformer 30. The side of transformer 30 connected to transmission 14 is shunted by compensators 21 and 28 and fixed capacitor 15. Although an advantageous location for this arrangement is between the switching stages of a central office wherein transformers 11 and 30 are disposed within a concentrated link, the described arrangement may be utilized at any convenient location in the telephone transmission system. Furthermore, the arrangement may be utilized without a repeater such as bidirectional amplifier 13.

In this application, transformer 11 is connected to an internal switching stage of the telephone central office while transformer 30 is connected to a peripheral switching stage of the telephone central office which couples the concentrated link to any one of a number of telephone subscriber loops such as telephone subscriber loop 31 in FIG. 1B. The impedance of the particular telephone subscriber loop connected to transformer 30 therefore has an unknown value, but the most likely kind of telephone subscriber loop coupled to the switching stage is a long loop of relatively high resistance so that the gain of bidirectional amplifier 13 offsets the signal loss. The impedance characteristic of telephone subscriber loop 31 is to be automatically modified by the disclosed arrangement to match the output of bidirectional amplifier 13. Usually this type of subscriber loop is of the loaded variety, for example, H-88 loaded cable (88 millihenry load coils are serially spaced 6000 feet apart in the cable).

Samples of the voltage and current applied by transformer 11 to bidirectional amplifier 13 are supplied to impedance monitor 32. The relationship between the voltage across transformer 11 and the voltage drop across resistor 12 is used by impedance monitor 32 to provide a control signal indicative of the input impedance of bidirectional amplifier 13 on the side coupled to transformer 11 which, in turn, is a function of the impedance presented by transmission line 14. The inputs of directional sensor 63 are derived from the internal circuitry of impedance monitor 32. While impedance monitor 32 provides a control signal representative of the impedance of the voltage and current of the bidirectional signals passing through bidirectional amplifier 13, directional sensor 63 compares the relative phase of the voltages and currents of the transmitted signal to each other and determines those voltages and currents indicative of the signal propagating from transformer 11 to bidirectional amplifier 13 to transmission line 14.

The relationship between the current and voltage of the signal applied to the left side of bidirectional amplifier 13 indicates the impedance of the other side of bidirectional amplifier 13 on transmission line 14 which is coupled through transformer 30 to subscriber loop 31. During this direction of signal propagation, directional sensor 63 closes switch 62 to complete a conductive path for the control signal output of impedance monitor 32 to variable compensators 21 and 28. Therefore, compensators 21 and 28 only serve to alter the impedance of the telephone subscriber loop 31 connected to transformer 30 which appears at two-wire transmission line 14. When signals are propagating in the opposite direction or when no signals are present, switch 62 is open and compensators 21 and 28 maintain the previous setting indicated by the control signal from impedance monitor 32.

In FIG. 1A, the active elements of impedance monitor 32 comprise operational amplifiers 33, 34 and 54. Amplifier 33 serves to magnify the voltage drop across resistor 12 which is coupled to it through resistors 36 and 37. The gain of amplifier 33 is fixed by the ratio of the resistivity of resistor 38 divided by the value of resistor 36 and the ratio of the values of resistor 39 to 37 wherein both ratios are equal to each other. The product of the gain of amplifier 33 and the value of resistor 12 produce a factor which partially determines the magnitude of the output voltage of that amplifier. This factor times the current $I_L$ flowing through resistor 12 produces the output voltage of amplifier 33. In this case, the factor has a value equal to the prescribed input impedance of bidirectional amplifier 13 (e.g., 900 ohms) on the left side of amplifier 13 plus the value of resistor 12. When the impedance of the transmission line on the left side of bidirectional amplifier 13 matches the prescribed input impedance, (e.g., 900 ohms), the voltage at the output of amplifier 33 is substantially equal to the value of $V_L$, the voltage across transformer 11. The value of resistor 12 is selected to be low so as not to dissipate an undue portion of the transmitted signal energy and not to change transmission impedances substantially. The voltage which appears across the input to the bidirectional amplifier 13 plus the voltage drop across resistor 12 is applied to the input of amplifier 34 via resistors 41 and 43. For this illustrative embodiment of the invention, the ratio of resistor 42 to resistor 41 and resistor 45 to 43 are unity and simply provides unity gain in amplifier 34. Therefore, the magnitudes of the output voltages of amplifiers 33 and 34 are equal to each other when the actual input impedance on the left side of bidirectional amplifier 13 matches the prescribed value of bidirectional amplifier 13.

In other embodiments of the invention, it may be desirable to reduce the amplitude of the signal indicative of signal voltage or employ a combination of amplifying the signal indicative of signal current and reducing the amplitude of the signal indicative voltage so that the relative magnitude of the two signals are equal when the actual input impedance on the left side of bidirectional amplifier 13 has a value substantially equal to the prescribed input impedance of the amplifier. Mathematically the general relationship may be expressed as:

$$A_{33} = \left( \frac{Z_o + R_{12}}{R_{12}} \right) A_{34}$$

wherein:
$A_{33}$ = Gain of amplifier 33
$Z_o$ = Prescribed input impedance of bidirectional amplifier 13
$R_{12}$ = Value of resistor 12
$A_{34}$ = Gain of amplifier 34.

From the equation above it is evident that once the values of $Z_0$ and $R_{12}$ are fixed, a change in value of $A_{33}$ will require a corresponding change in the value of $A_{34}$ in order to balance the equation.

The output of amplifier 33 is applied via diode 44 to the network comprising capacitor 46 and resistor 47. Similarly, the output of amplifier 34 is applied via diode 48 to the network comprising capacitor 51 and resistor 52. The time constants of both of these capacitive resistor networks are essentially equal and have a duration so that an average charge on the capacitors therein is maintained as the rectified voltages are applied thereto throughout the pronunciation of words during normal conversation. In other words, these networks provide an average d.c. output at what is commonly referred to as the syllabic rate. Amplifier 54 has the signal stored by the network comprising capacitor 46 and resistor 47 coupled to it by resistor 53 while the signal stored by the network comprising capacitor 51 and resistor 52 is applied to the other input of amplifier 54 through serial resistor 56. The gain of amplifier 54, as determined by the relative values of resistors 53 and 55 and the equal ratio of resistors 57 to 56, controls the sensitivity of the control loop in which impedance monitor 32 is contained.

A positive signal from amplifier 54 indicates that the magnitude of the input impedance of bidirectional amplifier 13 is greater than the prescribed input impedance of the bidirectional amplifier. When the impedance is less than the prescribed impedance, the output of amplifier 54 is negative. The output signal of amplifier 54 is applied to a level shifter circuit comprising resistors 58 and 59 wherein the junction of these resistors provides a signal of one polarity whose amplitude is proportional to the value of the impedance monitored by impedance monitor 32. The output of impedance monitor 32 is applied to switch 62 which is controlled by directional sensor 63.

Directional sensor 63 has the output of amplifiers 33 and 34 which represent voltages indicative of loop current $I_L$ and voltage $V_L$ coupled respectively to amplifiers 64 and 65 through resistors 66 and 72. The gain of amplifier 64 is determined by the ratio of resistors 67 and 66. Resistor 68, which is connected to the positive input of amplifier 64 and ground, and similarly resistor 77 connected to the positive input of amplifier 65 serve to balance out the two input impedances of each amplifier. Oppositely poled diodes 69 and 71, which shunt resistor 67, clamp the output of amplifier 64 so that it acts as a limiter. The gain of amplifier 64 is high such that limiting occurs on all intelligence or voice frequency signals that are above the inherent noise level on transmission line 14. Similar limiter operation is achieved by amplifier 65 through the action of oppositely poled diodes 74 and 76 which shunt resistor 73. The relative value of resistor 73 to resistor 72 determines the gain when amplifier 65 operates linearly or swings between the two clamped or limited voltage levels. The output of limiters 64 and 65 are applied to the separate differential inputs of amplifiers 81 via resistors 78 and 79. Amplifier 81 provides a positive output in accordance with the phase relationship between the instantaneous signal voltage and signal current of signals propagating from transformer 11 to transformer 30. The positive output of amplifier 81 is conducted by diode 84 to resistor 87 and turns on transistor 88. Diode 84 blocks the negative output from amplifier 81 which indicates signal voltage and current of a phase relationship that propagate in the opposite direction. Transistor 88 draws collector current through relay 89 which closes switch 62. Thus, the output of impedance monitor 32 is electrically connected to compensators 21 and 28 only during one direction of propagation via switch 62 and conductor 92. Capacitor 86, which is connected to the junction of diode 84 and resistor 87, serves to keep transistor 88 conducting and switch 62 closed during momentary signal lapses that correspond to silent intervals which normally occur between the syllables of spoken words.

Variable low frequency compensator 21 is a shunt network comprising inductor 23, capacitor 24 and a field effect transistor (FET) 22 which acts as a variable resistance device that shunts resistor 26 and serves to alter the effective resistance of line 14. Capacitor 27 connected to the high impedance gate of FET 22 maintains a charge so that the transistor maintains the previous setting when switch 62 is open.

High frequency compensation is accomplished with compensator 16, fixed build out capacitor 15, and variable high frequency compensator 28. In variable high frequency compensator 28, FET 93 changes resistance in response to the control signal on conductor 92. FET 93 shunts resistor 94 through serial capacitor 96 and serves to lower the effective emitter resistance of the common emitter amplifier including transistors 97 and 98. The collectors of transistors 97 and 98 are biased by resistor 100 while the base of transistor 98 is biased through resistors 102 and 103. As FET 93 changes the gain of transistors 97 and 98, the effective input capacitance between the terminals of compensator 28 varies due to the Miller effect on feedback capacitor 99. Capacitor 95, which is connected to the high impedance gate of FET 93, serves to maintain the high frequency compensation setting during the interval that switch 62 is open. Thus, FET 93 controls the gain of transistors 97 and 98 which serve to magnify the effective capacitance of capacitor 99 that appears in series with d.c. blocking capacitor 104 and changes the shunting capacitance on transmission line 14.

In operation, compensator 21 has considerable effect on the impedance of line 14 at frequencies below 1000 Hz and very little effect on frequencies above 1000 Hz. On the other hand, compensator 28 has very little effect on the impedance of transmission line 14 below 1000 Hz and a significant effect on impedances above that frequency. It should be noted at this point that impedance monitor 32 is only sensitive to the magnitude of the impedance on transmission line 14. Thus, compensators 21 and 28 must be designed so that as the magnitude of the impedance is corrected the phase angle of the impedance will not have a significant effect upon the operation of the circuit. Compensation of phase angle shift, which is more significant at higher frequencies, i.e., above 1000 Hz, is provided by compensator 16. Compensator 16 includes resistor 17, capacitor 18 and inductor 19 which form a parallel resonant circuit. The values of these components are selected so that the phase angle of impedance throughout the variable range of compensators 21 and 28 is kept within 25° of 0° and when the compensators are properly adjusted the phase angle will be within 10° of 0°.

Since compensators 21 and 28 provide frequency independence of adjustment, impedance monitor 32 provides one control signal which serves to operate both compensators. Use of this inherent independence and separation of frequency of the low and high frequency variable compensators eliminates the requirement of a second impedance monitor and filter networks to provide the frequency separation. If predominently high frequencies are present on the signal propagating from bidirectional amplifier 13 to transformer 30, impedance monitor 32 is primarily sensitive to the magnitude of the impedance at these high frequencies. Therefore, all the effective compensation is provided by high frequency compensator 28. Since the low frequencies present are insignificant, the fact that low frequency compensator 21 is improperly adjusted has no significant effect on the signal for which compensation is provided. If the propagating signal is primarily a low frequency signal, compensator 21 provides the effective compensation while compensator 28 is improperly adjusted, but it has no significant effect upon the operation. When both high and low frequencies are present in the transmitted signal, impedance monitor 32 produces a signal which corresponds to an average adjustment which will provide satisfactory impedance compensation for bidirectional amplifier 13.

FIG. 3 lists the range of values of representative loops for typical cables for which the illustrative embodiment herein disclosed will adequately compensate. The two right-hand columns of FIG. 3 list the actual values of capacitance required from variable compensator 28 in shunt with transmission line 14 to effect the impedance compensation at the two typical frequencies listed. The values of resistance in FIG. 3 are those required by variable compensator 21 to effect impedance compensation for each type of cable at the frequency listed. Although all of the cables listed in FIG. 3 are H88 loaded cable, other types of loaded cables may be advantageously compensated using the inventive concept disclosed herein. The end section column in FIG. 3 represents the distance from transformer 30 to the first load coil in the cable. About a range of 500 to 5000 ohms is readily provided by the appropriate selection of components values in low frequency compensator 21 while high frequency compensator 28 can be designed to provide a concurrent range of about 0.01 to 0.1 microfarads for the same voltage swing in the output of impedance monitor 32. This range is more than adequate to compensate the cables listed in FIG. 3 and the described impedance compensators may be used with a greater range of cables and other types of cables than those listed in FIG. 3.

What is claimed is:

1. In apparatus for modifying the impedance characteristics of a transmission line while transmitting a signal, the combination of, impedance monitor means in predetermined circuit relationship to said line comprising means for deriving a first signal proportional to the signal current flowing through said line, means for deriving a second signal proportional to the signal voltage across said line, means for changing the amplitude of at least one of said first and second signals to produce a pair of signals that have a substantially equal amplitude when said signal current and voltage are indicative of a prescribed impedance, and means for comparing the amplitude of said pair of signals to each other, said means for comparing including biasing means to produce a control signal at the output of said impedance monitor means having a magnitude indicative of the impedance of said line, impedance matching means responsive to the magnitude of said control signal comprising variable resistive means for changing the effective resistance of said transmission line as the magnitude of said control signal varies to provide compensation within a first frequency range and variable capacitive means for changing the effective shunting capacitance across said line as the magnitude of said control signal varies to provide compensation within a second frequency range for said line, the second frequency range including a predominance of frequencies higher than the frequencies of the first frequency range and at least one frequency in common with a frequency of the first frequency range, the compensation serving to alter the impedance of said line over the bandwidth of the transmitted signal to correspond substantially to said predetermined impedance magnitude within a frequency range that falls within the frequency spectrum coextensive with said first and second frequency ranges, and detecting means in circuit relationship with said line for ascertaining the direction of propagation of intelligence signals transmitted by said line, said detecting means including means for completing a conductive path for said control signal for application to said impedance matching means for a predetermined direction of propagation.

2. Apparatus as defined in claim 1 wherein said impedance monitor means further comprises rectifying means for conducting a given polarity of said first and second signals and filtering means for obtaining an average value so that when said monitor means compares the rectified first and second signals to each other a control signal is produced indicative of the average impedance of said transmission line.

3. Apparatus as defined in claim 2 wherein said detecting means further comprises first and second limiters, each connected to receive said first and second signals to produce a constant amplitude output and means for comparing the relative phase of the constant amplitude signals to each other to produce an output indicative of a predetermined direction of signal propagation.

4. Apparatus as defined in claim 3 wherein said variable resistance means comprises a voltage controlled device and series resonant circuit connected in series with said device to form a shunting circuit across said line for varying the effective resistance of said line.

5. Apparatus as defined in claim 4 wherein said variable capacitive means comprises a capacitor connected in a common emitter amplifier, said amplifier comprising first and second transistors each having collectors connected together and the emitter of the first transistor connected to the base of the second transistor and a voltage controlled device connected in the emitter of the second transistor to alter the gain of said amplifier and change the effective capacitance of said capacitor.

6. Apparatus as defined in claim 5 wherein said voltage controlled devices are field effect transistors which have capacitive means connected from the gate to ground potential, said capacitive means maintaining a charge on the gate of said field effect transistors during the intervals that said conductive path is open circuited.

7. Apparatus as defined in claim 6 further comprising compensating means in circuit relationship with said transmission line comprising a lossy resonant circuit for correcting the phase angle of impedance of said transmission line.

* * * * *